United States Patent [19]

Decorps et al.

[11] Patent Number: 4,563,757
[45] Date of Patent: Jan. 7, 1986

[54] METHOD AND APPARATUS FOR ACQUIRING SEISMIC SIGNALS IN A BOREHOLE

[75] Inventors: Jean-Luc Decorps, Paris; Guy Blanpain, Montrouge, both of France

[73] Assignee: Schlumberger Technology Corporation, Houston, Tex.

[21] Appl. No.: 511,809

[22] Filed: Jul. 8, 1983

[30] Foreign Application Priority Data

Jul. 13, 1982 [FR] France .................................. 82 12253

[51] Int. Cl.⁴ .......................... G01V 1/40; G01V 3/18
[52] U.S. Cl. ...................................... 367/33; 181/104; 181/105; 324/367
[58] Field of Search .................... 324/367, 374, 375; 367/911, 25, 33; 181/104, 105, 106, 108; 166/250, 254, 206

[56] References Cited

U.S. PATENT DOCUMENTS

| | | | |
|---|---|---|---|
| 2,846,662 | 8/1958 | Sparks | 367/58 |
| 3,356,146 | 12/1967 | Anderson | 324/367 |
| 3,423,671 | 1/1969 | Vezin | 324/374 |
| 3,426,865 | 2/1969 | Henry | 367/86 |
| 3,566,682 | 3/1971 | Winkler, Jr. | 324/367 |
| 4,117,394 | 9/1978 | Souhaité | 324/374 |

OTHER PUBLICATIONS

Lang, "Technique Expands Borehole Data," 7/9/79, Oil And Gas Journal, vol. 77 #28, pp. 139-143.

Primary Examiner—Nelson Moskowitz
Assistant Examiner—Ian J. Lobo

[57] ABSTRACT

The present invention relates to the acquisition of seismic signals at different levels in a borehole, in response to the generation of seismic waves by a source placed on the surface or in the vicinity of the surface. The acquisition is carried out by means of a sonde suspended in the borehole from a cable and equipped with an anchoring pad. At each acquisition level, the pad is anchored in the borehole wall to couple the sonde to the formation, and then the pad is released from the wall once the acquisition is over. The signals acquired are then sent to the surface by means of the cable. The force with which the pad is anchored in the wall is controlled by means of a feedback arrangement which includes a sensor arranged in the pad itself. During the sonde movements from one level to another, the pad is kept in contact with the wall.

16 Claims, 10 Drawing Figures

METHOD AND APPARATUS FOR ACQUIRING SEISMIC SIGNALS IN A BOREHOLE

BACKGROUND OF THE INVENTION

This invention relates to the acquisition, at different levels in a borehole, of seismic signals generated by a source placed in the vicinity of the surface opening of the borehole.

When the seismic waves produced by a source are recorded by means of a detector at different levels in a borehole, a series of seismic signals is obtained which are gathered, after suitable processing, to form a vertical seismic profile. The analysis of such a profile provides precious information on the structure of the geological formations traversed by the borehole, and notably on the position and the dip of the reflecting layers, including those which are located at a depth from the surface greater than the borehole bottom.

For a complete analysis, the recordings must be carried out at a very large number of different levels, for example 200 or more. This takes a very long time, especially as several measurements are carried out at each level in order to improve the quality of the signals.

SUMMARY OF THE INVENTION

The present invention aims to accomplish the acquisition of seismic signals in a borehole in an optimum manner relative to both the speed of acquisition and the quality of the signals acquired.

The object of the invention, according to one aspect, is a method for seismic signal acquisition at successive levels in a borehole, comprising the following operations:

(i) to a first level is lowered, by means of a cable, a sonde comprising an elongated body member, seismic wave detection means and an anchoring pad placed at the end of a support arm articulated on the body member and subject to extension under a spring force, said arm being maintained in the retracted position substantially along the body member during the lowering;

(ii) at a desired level, in the borehole, the arm is deployed to place the pad in contact with the borehole wall;

(iii) through the arm, a force is applied capable of anchoring the pad to the wall;

(iv) a seismic wave source is actuated to produce at least one detection signal;

(v) through the arm, a force is applied capable of releasing the pad from its anchored position on the wall;

(vi) the sonde is raised by means of the cable to another level, the pad remaining in contact with the wall under the action of the extended arm; and (vii) the sequence of operations (iii) to (vi) is repeated for the next levels.

By keeping the support arm in the extended position during the movements between successive levels a significant time saving is effected since it is thus possible to avoid having to retract the arm at the end of the measurements at one level and to extend it upon reaching the next level.

This characteristic of the arm extension mechanism is moreover exploited to obtain a log of the formations during these movements from level to level, for example a microresistivity measurement may be obtained by means of an electrode placed on the pad which remains constantly in contact with the wall. This additional measurement makes it possible to determine accurately the depth of the different seismic measurement levels, by, for example, correlation between this log and other logs carried out in the same borehole.

According to another aspect, it is the object of the invention to provide a sonde for seismic signal acquisition at different levels in a borehole, comprising:

an elongated body member;

seismic wave detection means placed in the body member;

a pad designed to be anchored in the borehole wall;

a pad support articulated on the body member and capable of occupying a retracted position substantially along the body member;

an elastic device acting to extend the pad away from the body member;

a drive device capable of furnishing a torque in both directions of rotation;

a clutch device mounted at the output of the drive device; and a transmission device mounted between the output of the clutch device and the pad support to extend the pad away from or retract it toward the body member according to the direction of the torque.

In accordance with one aspect of the invention the force which is applied to the pad, through its support, is effected by means of a drive device placed in the body. This force, exerted on the pad, is constantly measured by means of a force transducer placed in the pad, and the drive device is stopped when the force value thus measured reaches a given value. Preferably this value is selected to be equal to about twice the weight of the sonde in air.

BRIEF DESCRIPTION OF THE DRAWINGS

The subject invention will be better understood through the following description given with reference to the appended drawings.

In the drawings.

DESCRIPTION OF THE PREFERRED EMBODIMENT

Figures 1, 2:
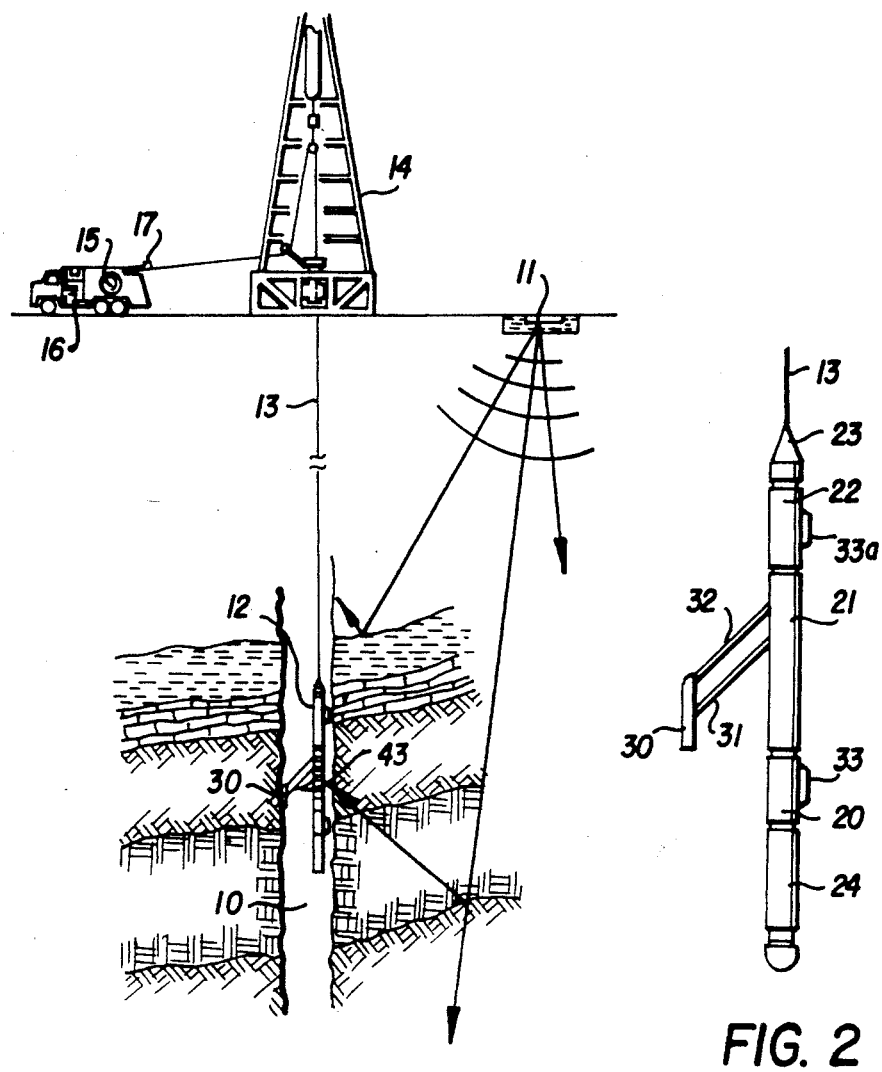
FIG. 1 represents an installation for seismic prospecting in a borehole.
FIG. 2 illustrates in a larger scale the seismic acquisition sonde represented in FIG. 1.

In FIG. 1 is represented an exploratory borehole 10 going through geological formations. A seismic wave source 11 such as an air gun is placed on the surface with a certain offset in relation to the surface opening or head of the borehole. The seismic shocks produced by the source are detected by means of a seismic acquisition sonde 12 lowered into the borehole.

The sonde 12 is suspended from the end of an electric cable 13 which runs over pulleys on the drilling tower 14 and is wound on a winch 15 carried by surface equipment 16. The surface equipment furnishes the sonde 12, through the cable 13, with electric power supply and control signals necessary for its operation. The returning seismic signals produced by the sonde are carried to the surface by the cable and recorded by the surface equipment. A device shown schematically at 17, associated with the winch 15, measures the travel of the cable and makes it possible to determine the depth of the sonde in order to match each seismic signal recorded with the depth of the sonde during the recording.

As illustrated in FIG. 2, the sonde 12 comprises essentially four sections; a detection section 20, an anchoring section 21 over the section 20 designed to ensure proper coupling of the detection section with the geological formation, an upper electronic cartridge 22 connected to the cable by a connection head 23, and an electronic cartridge 24 forming the lower end of the sonde. The cartridge 24 is connected electrically to the head 23 and contains circuits for the pre-processing of the detection signals produced by the section 20 and a telemetering device constituting the interface with the cable 13 for signal transmission. The upper cartridge 22 furnishes the power supply voltage to the anchoring section according to the signals addressed by the surface equipment and by other sections of the sonde.

The detection section 20 comprises at least one detector such as a geophone or an accelerometer. In a suitable manner are provided three such detectors placed in a triaxial configuration.

To obtain signals of satisfactory quality, it is indespensable to couple the detection section in an optimum manner with the formation. To accomplish this, the anchoring section comprises a pad 30, designed to be anchored in the borehole wall, carried by two arms 31 and 32 articulated on the sonde body member and at least substantially parallel. On the side opposite the anchoring pad, the detection section and the cartridge 22 include respective bearing elements 33 and 33a furnishing a suitable contact surface with the wall.

Figure 3:
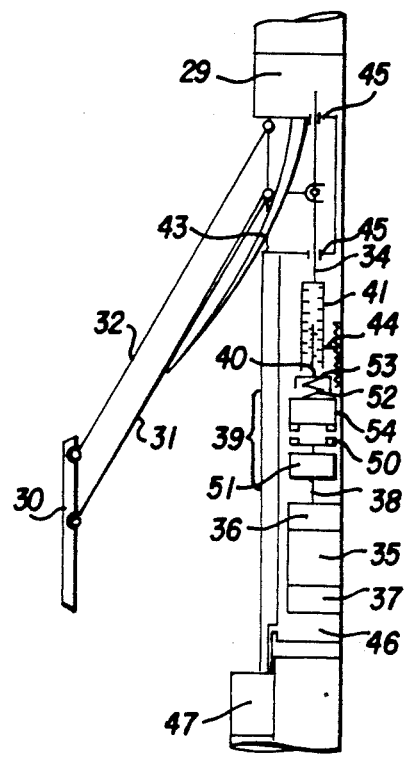
FIG. 3 is a schematic view of the sonde anchoring section.

FIG. 3 is a functional diagram of the anchoring section. The anchoring force is transmitted to the pad 30 through the lower arm 31. The swiveling of the arm 31 is produced by the travel of an actuating rod 34. The connection between the arm 31 and the rod 34 will be described in detail below. The anchoring force is furnished by a reversible asynchronous motor 35 of the torque motor type equipped with an output reducer 36 and an electromagnetic brake 37 active in the absence of current. The output shaft 38 of the reducer 36 is connected via a coupling device 39, which will be described in detail below, to a ball screw 40 engaging with a nut 41 which drives the actuating rod 34. In addition, a loading device 43 loads the arms 31, 32 constantly in their outward extension direction.

Also shown schematically in FIG. 3 is a potentiometer 44 which makes it possible to measure the movement of the nut 41 and hence the distance between the anchoring pad and the sonde, this distance being indicative of the borehole diameter.

Joints 45 allow the travel movement of the rod 34 while preventing ingress of drilling mud into the internal space 46 containing the motor assembly 35–38, the coupling device 39 and the screw-nut system 40–41. A pressure compensation device 47 of a well known type in logging sondes is placed at the lower end of the anchoring section. Its function is to place the internal space 46 in pressure equilibrium with the drilling mud. Pressure on the opposite faces of the joints 45 is thus substantially the same.

The coupling device 39 as represented in FIG. 3 comprises essentially a clutch device 50, a mechanical logic 51 controlling clutch engagement or disengagement according to the direction of rotation of the motor and the forces exerted on the pad, a spring 52 and a stop 53, and a torque limiter 54.

These elements will be described in detail below with reference to FIGS. 4 and 5.

Figure 4:
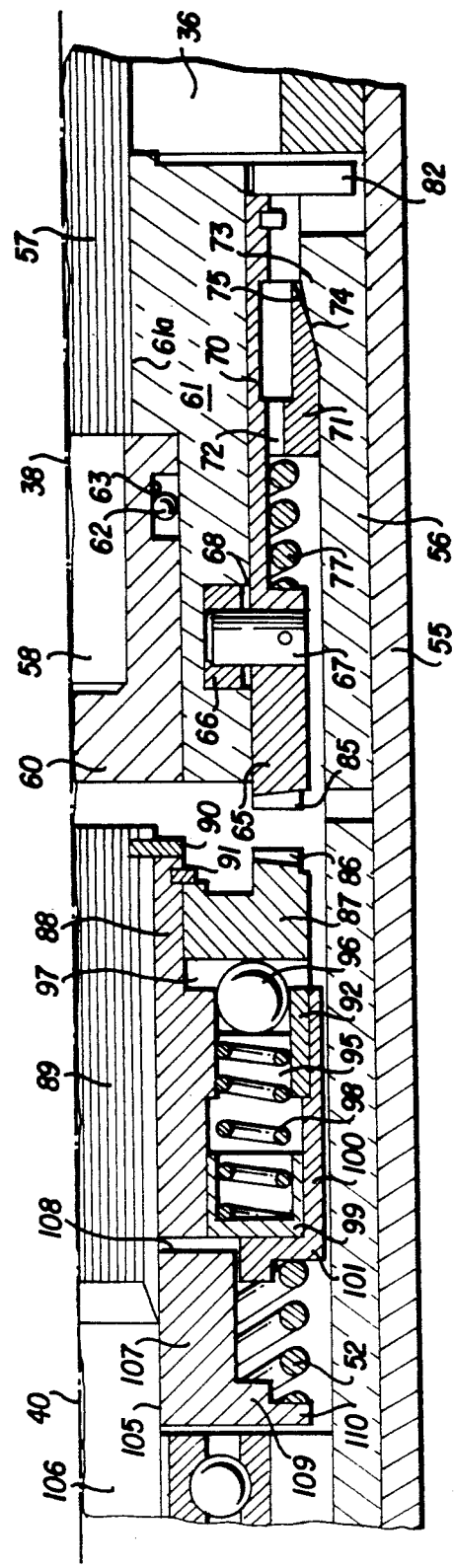
FIG. 4 illustrates, in axial section, the anchoring section device.
Figure 5:
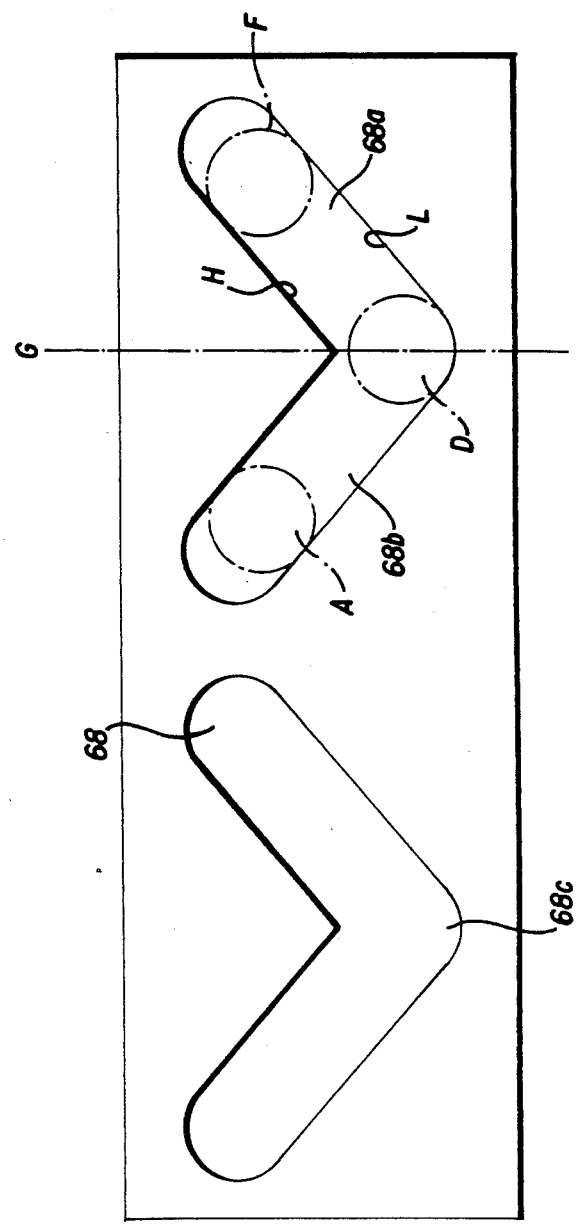
FIG. 5 illustrates a detail of the coupling device.

In FIG. 4 is shown the reducer 36 and its output shaft 38, on one side, and the end of the ball screw 40 on the opposite side. Also shown is the external sheath 55 forming part of the sonde body member and a tubular envelope 56 attached to the sheath 55.

The shaft 38 includes a splined portion 57 and an end portion 58 of smaller diameter which is threaded.

On the end of the shaft 38 is screwed a ring 60. A bushing 61 slidingly surrounds the ring 60 and includes splines 61a engaging with the splines of the shaft portion 57; the bushing 61 being up against the case of the reducer 36. The ring 60 and the bushing 61 thus rotate with the shaft 38. A pin 62 goes through the bushing 61 and into a groove 63 formed on the periphery of the ring 60. This pin allows the extraction of the bushing 61 when the ring 60 is unscrewed.

Around the bushing 61 is placed a clutch sleeve 65. The sleeve 65 is connected to the bushing 61 by the engagement of two diametrically opposite rollers 66 mounted on respective studs 67 fixed on the sleeve 65. The studs 67 are fixed in respective helical cam slots 68 formed in the outer periphery of the bushing 61. FIG. 5 shows, in a developed view, the form of the slots 68. Each cam slot 68 comprises two sections 68a, 68b symmetrical with respect to a generatrix G of the bushing. The sections 68a, 68b meet on the side of the drive shaft in the central portion 68c. The preferred value for the angle between the cam slot sections 68a and 68b is about 90°, as shown in FIG. 5.

Means are provided for blocking the rotation of the sleeve 65 when its axial position is within a given range so that the rotation of the shaft 38 and hence of the bushing 61 causes the traveling of the sleeve 65. For this purpose, the sleeve 65 includes, on the drive side, a part 70 of smaller outer diameter than the part which carries the studs 67. In the annular space thus provided between the sleeve and the fixed envelope 56 is placed a friction ring 71 connected in rotation with the sleeve 65 but mobile axially in relation to this sleeve. The ring 71 includes, internally, an axial keyway 72 into which is engaged a key 73 fixed on the sleeve 65. The friction ring 71 has an outer surface 74 of spherical form, and the inner surface of the envelope 56 opposite the ring 71 has a truncated part 75. A helical spring 77 is mounted between the shoulder terminating the small-diameter part 70 and the frinction ring 71. When the surfaces 74, 75 are in contact, as shown in FIG. 3, the friction due to the force exerted by the spring 77 is such that the sleeve 65 is prevented from turning with the bushing 61. A rotation of the bushing 61 will then cause the sleeve 65 to travel.

Furthermore, a circlip 80 is mounted in a groove in the vicinity of the reducer side end of the sleeve 65. This circlip is used to push the friction ring 71 against the action of the spring 77 after a certain axial movement of the sleeve, thereby providing a lost motion-connection between the ring 77 and the sleeve 65. The movement of the ring 71 resulting therefrom causes the friction between the surfaces 74, 75 to disappear and enables the sleeve 65 to be driven in rotation by the shaft.

Moreover, an electric contact 82 connected to the tubular envelope 56 is placed in the vicinity of the reducer 36. This contact is actuated by the sleeve 65 when the latter occupies its end position near the reducer. The pulse produced by this contact serves to cut off the power supply of the motor 35.

The sleeve 65 includes, at its end opposite the reducer, a toothed plate 85 designed to mesh with a toothed plate 86 formed on a counter-ring 87. The toothed plates 85 and 86 comprise radial teeth of triangular section.

The counter-ring 87 is mounted rotatably around a splined bushing 88 rotable with the screw 40, whose end 89 comprises corresponding splines. Stop circlips 90 and 91 are mounted respectively on the screw 40 and on the bushing 88 to serve as an axial stop respectively for the housing 88 and the counter-ring 87.

On the opposite side, the radial surface of the counter-ring 87 is separated by a small clearance from a collar 92 extending the bushing 88 radially. The collar 92 comprises a plurality of axially directed holes 95 each of which receives a ball 96, and the counter-ring 87 comprises similarly a plurality of radial grooves 97 into which the balls 96 penetrate respectively. Each of the balls 96 is loaded elastically against the bottom of the corresponding groove 97 by a helical spring 98 bearing on a U-section ring 99, this ring being blocked in rotation in relation to the bushing 88. The ring 99 is positioned axially by an adjustment ring 100 screwed on the threaded outer surface of the collar 92 and comprising a radial portion 101 in contact with the ring 99.

The assembly made up of the bushing 88, the balls 96 and the elements 98-100 constitutes the above-mentioned torque limiter. In fact, the balls 96 maintained against the bottom of the grooves 97 by the action of the springs 98 transmit normally the torque of the counter-ring 87 to the bushing 88. However, after a certain value, the balls move away from the bottom of the grooves, compressing the springs 98, and the torque is no longer transmitted.

A ring 105 is screwed on a threaded part 106 of the screw 40, following the end 89. The ring 105 comprises successively, from the end of the screw, a small-diameter portion 107 which, with its radial end face, forms a stop for the bushing 88 and constitutes the stop 53 mentioned above with reference to FIG. 3, an intermediate-diameter portion 109 and a larger-diameter part 110 which serves as a support for the helical spring 52 also mentioned above, said spring acting on the radial portion 101 of the adjustment ring 100, and hence indirectly on the counter-ring 87 carrying the toothed plate 86.

The screw-nut system 40, 41 has no particular feature requiring a detailed description. The nut 41 is, in a classical manner, required to move only in translation, so that a rotation of the ball screw 40 in one direction causes a translation of the nut 41 in the corresponding direction.

Figure 6:
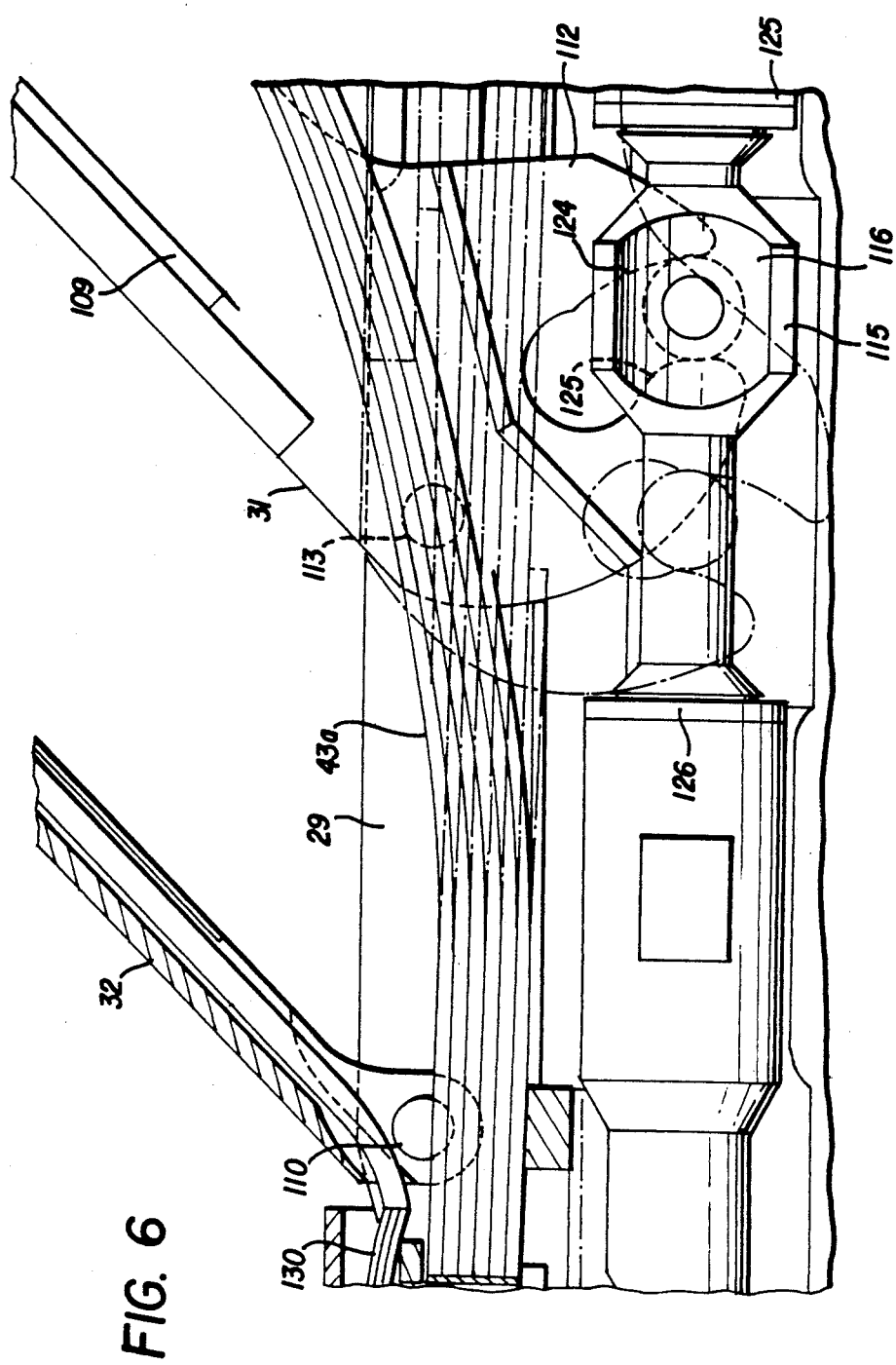
FIG. 6 represents the articulation of the anchoring arm on the sonde.
Figure 7:
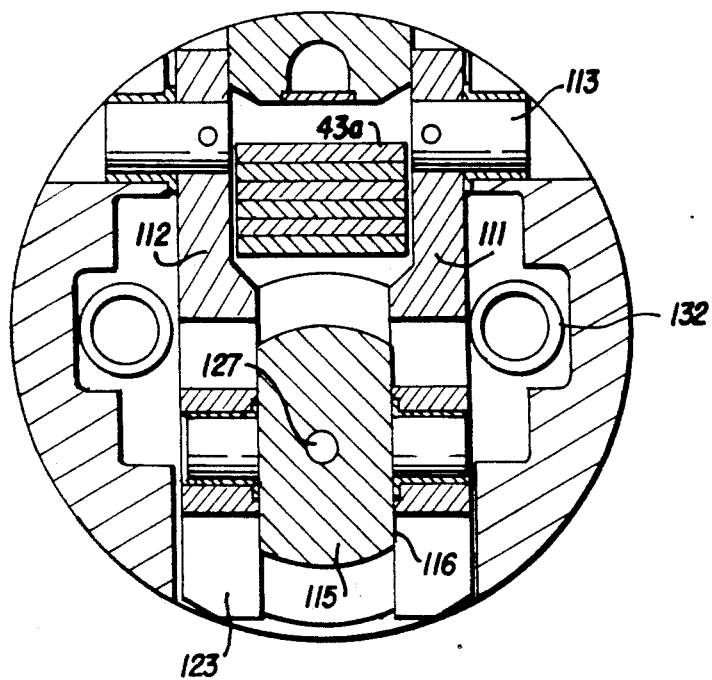
FIG. 7 is a section along the plane VII—VII of FIG. 6.

FIGS. 6 and 7 show in greater detail the articulation of the arms 31 and 32 on the sonde. The upper arm 32 is connected to the sonde body member 29 by a pivot 110. The lower arm 31 which transmits the forces to the pad 30 is made up of two identical parallel side plates connected by spacers such as 109, which are extended by identical hooks 111, 112 spaces away from each other.

The hooks 111, 112 are transversed by a pivot 113 connected to the sonde body member, the pins of the pivots 110 and 113 being perpendicular to the axis of the sonde and equidistant from this axis.

The hooks 111, 112 surround, at their end, a part 115 of the actuating rod 34, said part comprising flat portions 116 parallel to the pivoting plane of the arm 31. On each side of this part 115 are fixed rollers 121. The hooks 111, 112 each comprise an elongated slot 123 engaged around a roller 121 so that a movement of the rod 34 causes a swivelling of the arm 31 around the axis 113. In FIG. 6, the solid line represents the maximum extension position of the arm 31 and the broken line the retraction position.

The walls 124, 125 of the slots 123 in contact with the rollers 121 have substantially the form of circle involutes. An involute is the geometrical locus of a point of a line D which rolls without sliding on a circle C. In the present case, the line D is the axis of the rod 34 and the circle C is centered on the center of rotation of the arm 31, i.e. the axis of the pivot 113, and tangent to the axis of the rod 34. During the rotation of the arm 31, a point connected to the rod 34 and in contact with a side plate of the arm 31 will thus describe an involute. These curves have the property of having a tangent which is constantly perpendicular to the line D, i.e. in this case to the rod 34. The advantage is that a force can be transmitted to the arm without introducing any radial component on the actuating rod 34.

It will also be noted, with reference to FIGS. 6 and 7, that a leaf spring 43a forming part of the loading device 43 mentioned above is fixed on the sonde body member 29 in the vicinity of the pivot 110 of the upper arm 32 and that it passes between the hooks 111, 112 of the arm 31. Further, the rod 34 traverses, on each side of the engagement zone with the arm 31, cases 125, 126 within which are mounted the joints 45 mentioned above. The oil placed under the pressure of the drilling mud by the compensation device 47 can flow up to the end of the rod 34 through a central passage 127.

Also represented in FIG. 6 are conducted 130 carried by the arms 32, which connect the pad 30 to the cartridge 22 and, in FIG. 7, sheaths 131 receiving the electrical conductors which connect the cartridge 22 to the detection section and to the anchoring section, notably for the control of the motor 35.

Figure 8:
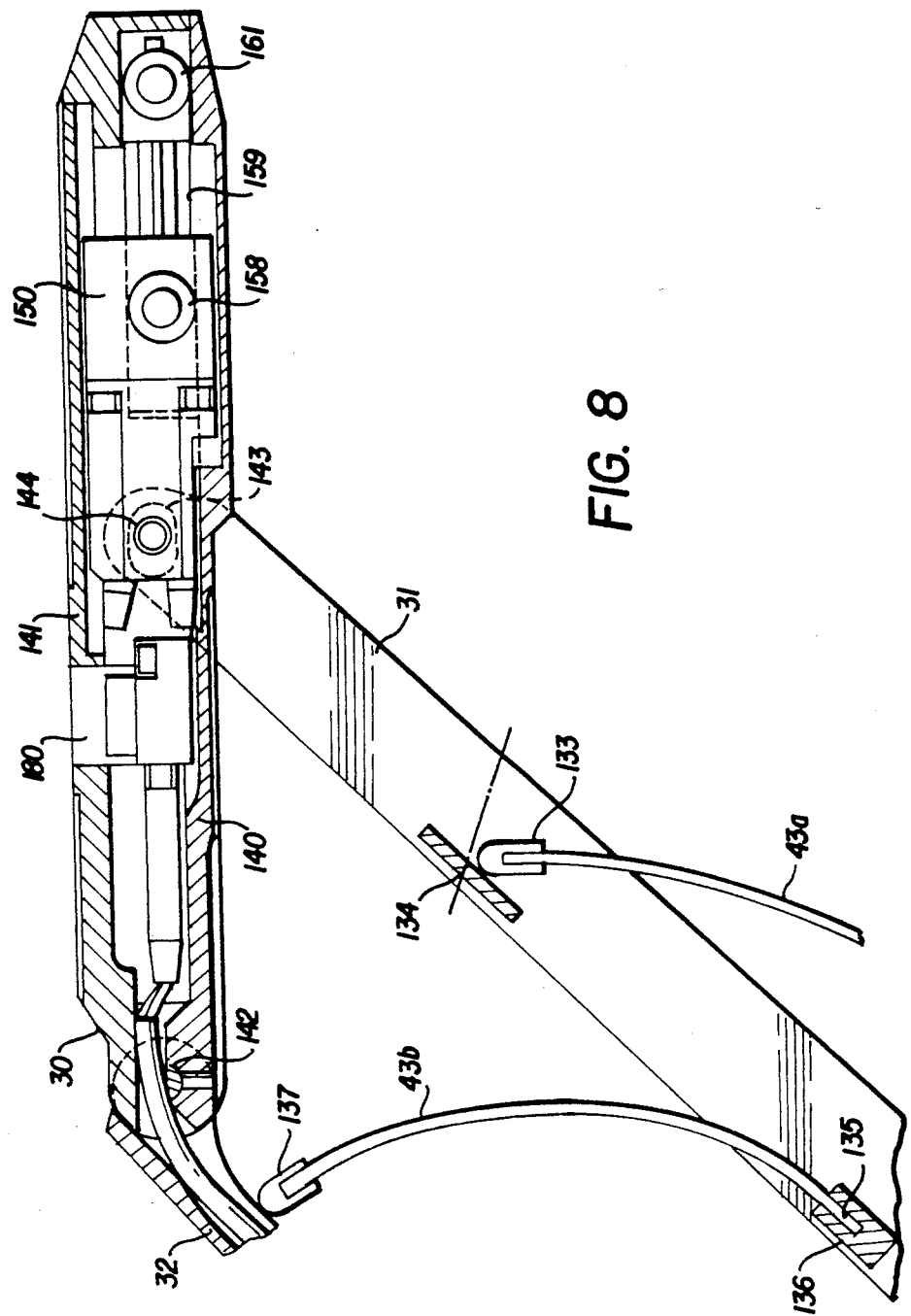
FIG. 8 is a longitudinal section of the anchoring pad.

FIG. 8 shows the arrangement of the loading device 43. The leaf spring 43a mentioned above with reference to FIG. 6, which is fixed at one end to the sonde body member, acts through its opposite end 133 on a web part 134 of the arm 31 placed between the side plates, a relative sliding between the end 133 and the part 134 occurring during the swiveling of the arm 31. A second spring 43b, made up of a single leaf and hence lighter than the spring 43a, is fixed by one end 135 to another web piece 136 of the arm 31, placed closer to the pivot 113 than the part 134. The other end 137 of the spring 43b acts on the upper arm 32 in the vicinity of its end, also with a sliding when the arms swivel.

FIG. 8 shows in greater detail the anchoring pad 30. The pad 30, as was seen, is mounted at the end of the upper arm 32 and the lower arm 31, only one side plate of which is shown in the sectional view of FIG. 8, said side plates surrounding the pad.

The pad 30 comprises a hollow body 140 on the inside and a wear plate 141 intended to come into contact with the wall, fixed on the pad body 140. The wear plate 141 is provided on its surface with grooves in order to optimize its anchoring in the wall.

The pad body 140 is connected to the upper arm 32 by a pivot 142. It also comprises, substantially in its middle, openings 143 made in its side walls. The openings 143 have the form of rectangles with rounded apexes, and receive a pivot 144 connected to the side plates of the lower arm 31.

Figure 9:
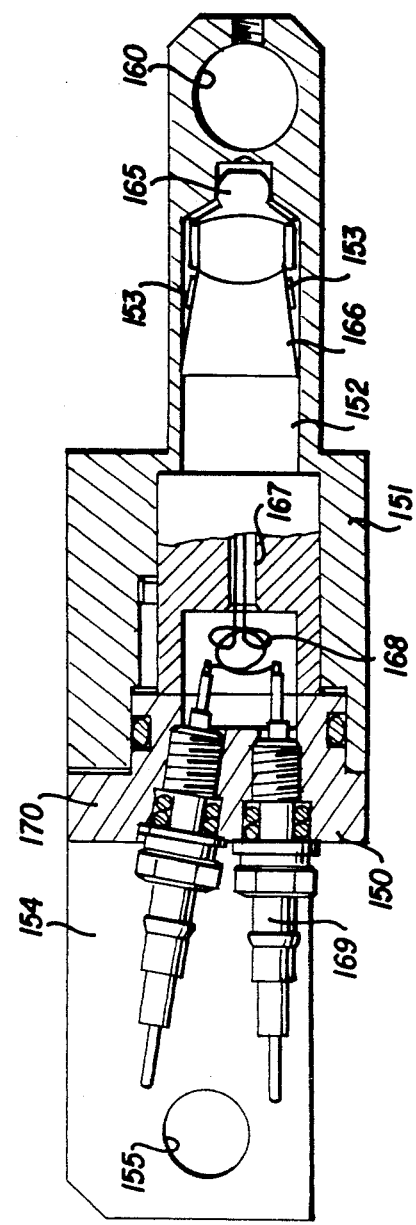
FIG. 9 illustrates the force transducer housed in the pad.

A force transducer, designated as a whole by the reference 150, is housed in the pad body 140. This transducer, shown in greater detail in FIG. 9, has strain gauges as its sensistive elements. It includes a pressure-resistant sheath 151 of rectangular section within which is placed a bending element 152 carrying the strain gauges 153.

The sheath 151 is extended on the upper side by two side plates 154 provided with holes 155 which snugly receive the pivot 144 connected to the arm 31. The sheath 151 also has, roughly in its middle, two rollers 158 engaged in elongated slots 159 formed in the lateral walls of the pad body. In the vicinity of its lower end, the sheath 151 has a hole 160 in which is engaged a rod 161 whose ends penetrate respectively into the slots 159.

Summarizing, the pad body 140 is mounted swivelably in relation to the upper arm 32 and it is connected to the lower arm 31 through the force transducer 150 which, on the one hand, can move in translation relative to the pad body and, on the other, is connected to the arm 31 by the pivot 144, the clearance between the pivot 144 and the pad body being limited by the edges of the openings 143 formed in the pad body. The result is that the pad has the possibility of rocking slightly in one direction or the other in relation to the middle position, parallel to the axis of the sonde, which is that shown in FIG. 8. When the pad moves away from its middle position, the upper arm 32 swivels slightly in relation to the sonde while moving away from its position parallel to the lower arm 31.

This ability to rock enables the pad 30 to mate closely with the borehole wall even if this wall has an irregularity at the point of contact with the pad. This is advantageous for obtaining good anchoring. In addition, the forces on the pad will be distributed regularly over its entire surface so that the measurement carried out by means of the force transducer, which is related to the force at the level of the pivot 144, will be representative of the force on the entire pad.

It will be noted that the design of the loading device, with the two springs 43a and 43b, eliminates the risk of the arm-pad assembly jamming in the retracted position which could have resulted from the rocking of the pad.

As concerns the force transducer, it should be indicated that the bending element has a lower end 165 similar to a ball joint engaged in the bottom of the recess formed inside the sheath 151. The strain gauges 153 are placed on inclined flat portions 166 formed on the opposite sides of the bending element. On each flat portion are placed two gauges, and the four gages are connected in a "complete bridge" arrangement in a manner which is customary in the technique of strain gauge measurements. The bending element has conduits such as 167 for the passage of electric conductors 168 connecting the circuit of the gauges to four connectors 169 (two for the power supply and two for transmitting the detection signal) which go through a sealing block 170 fixed to the sheath 151. Conductors, not shown in FIG. 8 and carried by the arm 32, connect these connectors to the electronic cartridge 22.

The force transducer thus inserted into the pad furnishes an indication of the actual force on the pad. The measurement of the anchoring force furnished by the transducer gives excellent reproducibility because, since what is involved is a measurement made directly at the level of the pad, the error factors are minimized. This measurement is used for stopping the operation of the motor 35 when the anchoring force has reached a given value considered as satisfactory. This value is chosen in a suitable manner equal to about twice the weight of the sonde in air.

In addition, the measurement value furnished by the transducer is transmitted via the cartridge 24 to the surface equipment, making it possible to monitor the quality of the anchoring during the series of firings carried out at the same level. It may occur, particularly in soft formations, that the anchoring force decreases after a few firings. Thanks to the transducer mounted on the pad, this decrease will be detected and it will be possible to remedy the situation by restarting the motor, which will stop automatically once the anchoring force has come back to the desired value. Such a possibility is of great value considering the fact that, as was seen, the anchoring force is an essential parameter for the quality of the seismic detection signals.

Figure 10:
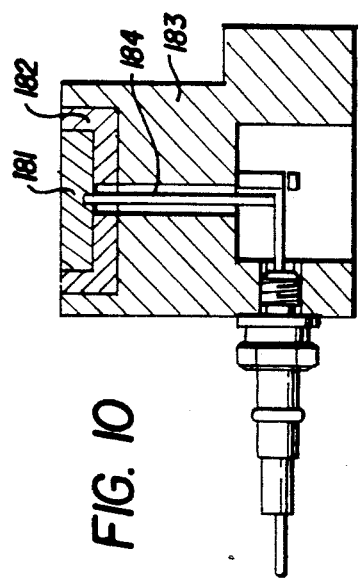
FIG. 10 illustrates the electrode device housed in the pad.

The pad also has a device 180 designed to emit an electric current to evaluate the resistivity of the surface zone of the formation traversed by the borehole. This device, shown in greater detail in FIG. 10, includes an electrode 181 in conducting material placed on an insulation 182 itself contained in a hollow of a support 183 in conducting material acting as a ground. This support has a conduit for the passage of an electric conductor 184 connected to the electrode 181. The return of the electric current thus emitted can be effected by the connection head 23 connecting the cartridge 22 to the cable 13. It is thus possible to obtain a microresistivity log which may be correlated with other logs carried out in the same borehole to determine accurately the depth of the anchoring levels.

The operation of the sonde described above will now be described during a complete measurement cycle.

The sonde is lowered into the borehole with the arms 31, 32 in the retracted position. In this position, the motor 35 is not supplied and is blocked by its brake 37. The coupling device is clutched, i.e. the toothed plates 85, 86 are engaged and the bushing 88 is up against the part 107. The resistant torque furnished by the motor opposes the extension of the arms under the action of the leaf spring 43. Each of the rollers 66 occupies an advanced position F in the section 68a of its cam slot, in contact with the lower wall L of said section.

When the sonde reaches the level $H_1$ corresponding to the first measurement planned, the motor 35 is started up in the counterclockwise direction. The arms 31, 32 can then move away under the action of the leaf springs 43. In this extension phase, the motor 35 acts only to limit the arm extension speed. The rollers 66 are kept in contact with the lower walls L by the action of the springs 43, so that the spring 52 cannot act to move the bushing 88 away from the stop 107.

When the pad 30 comes into contact with the borehole wall, the action of the springs 43 ceases. With the motor 35 continuing to rotate in the same direction, the rollers 66 come into contact with the upper walls H of the sections 68a of the cam slots. The spring 52 then drives the bushing 88 away from its contact with the stop 107 and also the sleeve 65. The friction ring 71 moved with the sleeve rubs against the conical surface 75.

When the bushing 88 comes up against the circlip 90, the action of the spring 52 ceases. The pursual of the rotation of the motor 35, since the rotation of the sleeve 65 is blocked by the friction of the ring 71, causes a movement of the wheels 66 in the cam slots toward the middle portion 68c (position D of wheels). The sleeve 65 thus moves in the direction of the reducer, this movement bringing about complete decoupling of the toothed plates 85, 86. The device is thus placed in the unclutched position. When the sleeve 65 reaches the end position shown in FIG. 4, the microswitch 82 is energized and the pulse produced stops the motor 35.

To anchor the pad in the wall, the motor 35 is started up again, still in the opposite direction. The wheels 66 then advance in the sections 68b of the cam slots. The toothed plate 85 comes into contact with the plate 86. During this first movement of the sleeve, the friction ring 71 is not moved.

With the rotation of the motor continuing, the rollers 66 continue to advance and the sleeve 65 drives the bushing 88 against the action of the spring 52. With this, the circlip 80 drives the friction ring 71 back so that the friction which prevented the sleeve 65 from turning disappears gradually. However, the motor torque is not really transmitted to the bushing 88 until the latter is in contact with the stop 107. Until then, the motor torque has served only to overcome the action of the spring 52. When this contact takes place, the rollers 66 have reached their end position A in the sections 68b.

As of this contact, the coupling device being in the clutched position, the motor torque is transmitted to the screw 40. The rod 34 connected to the nut 41 moves in the direction of the reducer to anchor the pad in the wall. This movement of the rod is very limited, of the order of a few millimeters.

The transducer 150 sends to the cartridge 22 a signal representative of the anchoring force on the pad. When the force reaches the above-mentioned predetermined value, corresponding to a satisfactory anchoring, the cartridge 22 stops the motor 35.

The phase which follows is the seismic acquisition phase proper at the considered level. Several successive firings are carried out by means of the source 11, and the seismic waves which are propagated on the formations are detected by the detection section. The detection signals produced following the respective firings are transmitted by the cartridge 24 and the cable 13 to the surface equipment 16 where they are recorded on a graphic medium and on magnetic tape.

Throughout this phase, the position of the elements of the anchoring section does not vary: motor blocked by its brake, coupling device clutched. The only difference compared with the retracted position is that the rollers 66 are in the slot sections 68b instead of being in the slot sections 68a.

As indicated above, the monitoring of the anchoring force makes it possible to remedy any reduction in this force during the seismic acquisition. To accomplish this, it is sufficient to start up the motor 35 again, still in the opposite direction. The motor will be stopped as soon as the anchoring force reaches the desired value.

After this measurement phase, the pad 30 must be dislodged from the wall. The motor 35 is started up in the clockwise direction (direct direction), thereby ending the action of the brake 37. As long as a force on the pad due to the elasticity of the formation is exerted in the disanchoring direction on the screw 40, the rollers 66 remain in the position A. When this force is cancelled, the spring 52 drives back the bushing 88 out of contact with the stop 107. The corresponding movement of the sleeve 65 allows the friction ring 71 to come back into contact with the conical surface 75. The action of the spring 52 ceases when the bushing 88 comes up against the circlip 90. The rotation of the sleeve 65 is then blocked and, owing to the rotation of the motor, the sleeve undergoes a translation in the direction of the reducer, after which the toothed plate 85 ceases to be engaged with the toothed plate 86.

At the end of this movement, the rollers 66 have reached the position D in the central part of the cam slots, and the sleeve 65 actuates the switch 82 so that the motor 35 stops. The pad 30 is kept in contact with the borehole wall by the springs 43.

The next phase is the movement of the sonde from the level $H_1$ to a second measurement level $H_2$, by winding the cable 13 on its winch. During this movement, the motor 35 remains stopped, the coupling device remains in the unclutched position, the rollers 66 remaining in position D, and the pad slides over the borehole wall, the contact being maintained with the wall by the springs 43.

During this movement, the electrode 181 thus remains in contact with the wall. It is supplied with current throughout the movement. The current which flows through the formation is, as seen, indicative of the resistivity of a zone of small thickness around the borehole.

When the sonde has reached the second measurement level $H_2$, the anchoring, seismic acquisition and disanchoring operations are repeated and the sonde is brought up to a third measurement level $H_3$, and so on.

It will be observed that since the pad remains constantly in contact with the wall, the only mechanical operations to be carried out at each level are the anchoring and disanchoring of the pad, and that there is no need to extend and retract the arms carrying the pad at each level. This represents a time saving, especially as the total number of measurement levels for a complete cycle can be more than a hundred.

Once the disanchoring of the pad is completed at the last measurement level, the arms 31, 32 must be retracted to bring the sonde back up to the surface. For this purpose, the motor 35 is started up in the direct direction. The rotation of the sleeve 65 is initially blocked by the friction ring 71, and the rollers 66 in the position D corresponding to unclutching.

Owing to the rotation of the motor, the wheels advance in the groove section 68a.

The sleeve 65 moves until contact is made between the toothed plates 85, 86 then, with the springs 43 exerting a resistant torque on the bushing 88, the sleeve 65 continues its travel while driving back the bushing 88 against the action of the spring 52. When the bushing 88 comes into contact with the stop 107, the motor torque is transmitted to the bushing 88 and overcomes the resistant torque offered by the springs 43 to cause the swivelling of the arms 32, 32 up to their retracted position along the sonde body member.

We claim:

1. Method for seismic signal acquisition at successive levels in a borehole, comprising the steps of:

(i) lowering to a first level a sonde comprising: an elongated body member, a seismic wave detection means in said body member and an anchoring pad placed at the end of a support articulated on the body member, said support being maintained in the retracted position, substantially along the body member, during the lowering;

(ii) deploying the support to place the pad in contact with the borehole wall and bring the body member into engagement with the borehole wall in an area opposed to the area engaged by the pad;

(iii) displacing the support in a direction away from the body member by means of a reversible drive device located in the body member, to anchor the pad to the wall and couple the body member and the seismic wave detection means to the borehole wall;

(iv) actuating the seismic wave detection means;

(v) displacing the support, in a direction towards the body member by means of said reversible drive device to release the pad from its anchored position on the wall to a position still in contact with the borehole wall;

(vi) raising the sonde to a second level while maintaining the pad in contact with the borehole wall by the action of an elastic device, the drive device being uncoupled from the support during this step; and (vii) repeating the sequence of operations (iii) to (vi) for each of the next succeeding levels.

2. The method of claim 1 where in said step (iii) the reversible drive device applies to the pad an anchoring force equal to about twice the weight of the sonde.

3. The method of claim 1 further comprising the step of detecting during the moving step (vi) a characteristic of the formations traversed by the borehole by measuring means, other than said seismic wave detection means, carried at least partly by the pad.

4. The method of claim 3, wherein in said detecting step a characteristic of the electrical resistivity of the formations is measured.

5. The method of claim 3 where in said step (iii) the reversible drive device applies to the pad an anchoring force equal to about twice the weight of the sonde.

6. Sonde for seismic signal acquisition at different levels in a borehole, comprising:
an elongated body member;
seismic wave detection means;
a pad designed to be anchored in the borehole wall;
a support, for carrying said pad, articulated on the body member
a reversible drive device operable to displace the support in a direction away from, or towards, the body member; and
an elastic device for urging the support away from the body member.

7. The sonde of claim 6, comprising
a clutch device mounted at the output of the drive device.

8. The sonde of claim 7, wherein the clutch device comprises:
a bushing connected to the output of the drive device;
a sleeve connected to the bushing by the engagement of at least one projection in a slot formed by two helical sections symmetrical with respect to a plane going through the axis of rotation of the bushing and connected by a middle portion;
means for blocking the rotation of the sleeve when said projection is within a given position range centered on said middle portion;
an output element mobile axially between a first and a second position and loaded elastically toward this second position;
coupling means connected respectively to the sleeve and the output element, the engagement between these means taking place as of a given distance of said projection from the middle portion.

9. The sonde of claim 8, characterized by the fact that it comprises a position detector designed to emit an electric pulse when said projection occupies the middle slot portion, said pulse controlling the actuation of the drive device.

10. The sonde of claim 8, characterized by the fact that said blocking means comprise a substantially truncated surface formed within the body member and a friction ring lodged between the sleeve and the body member and having a substantially spherical surface, said ring being rotatable with the sleeve and movable therewith with a lost motion, the ring being loaded elastic ally in the direction of contact between said surfaces, such a contact having the effect of securing the ring and hence the sleeve against rotation.

11. The sonde of claim 6, wherein said seismic wave detection means is carried in said elongated body member.

12. The sonde of claim 7, comprising an axially moving rod connected to the output of the clutch device, and wherein the pad support comprises two arms articulated on the body member substantially in a parallelogram configuration, namely an upper arm and a lower arm, the lower arm being connected to said axially moving rod, so as to pivot when the rod goes through a travel movement, the link being obtained by the engagement of at least one roller connected to the rod in an elongated slot formed in an extension of the arm, the walls of said slot having substantially the form of involutes of a circle.

13. The sonde of claim 12, characterized by the fact that the pad is swivelably connected in the vicinity of its upper end to the upper arm and is connected in its middle to the lower arm to enable it to move away on either side of a middle position parallel to the axis of the sonde body member.

14. The sonde of claim 13, characterized by the fact that the elastic device comprises a first leaf spring fixed to the body member by one end and acting through its other end on the lower arm and a second leaf spring fixed to the lower arm and acting on the upper arm in the vicinity of its articulation with the pad.

15. The sonde of claim 10 further comprising an electrode device carried by the pad support for emitting an electrical current.

16. Method for the acquisition of seismic signals at successive levels in a borehole, comprising the steps of:
(i) lowering to a first level a sonde comprising an elongate body member, a seismic wave detection means in said body member, and an anchoring pad placed at the end of a support articulated on the body member, the extension of the support causing the pad to engage the borehole wall at one side and the body member to engage the borehole wall at the opposite side;
(ii) bringing the pad into engagement with the borehole wall to create an elastic coupling of the pad to the wall;

(iii) producing a rigid coupling of the pad to the borehole wall to couple the seismic wave detection means to the borehole wall;

(iv) producing seismic signals by means of said seismic wave detection means in response to the propagation of seismic waves;

(v) releasing the pad from said rigid coupling with the borehole wall to return the pad to a condition of elastic coupling to the wall;

(vi) displacing the sonde through the borehole from said first level to a second level while maintaining the elastic coupling of the pad to the borehole wall; and (vii) repeating the sequence of steps (iii) to (vi) for each of the next levels.

* * * * *